UNITED STATES PATENT OFFICE.

LUCIEN JUMAU, OF PARIS, FRANCE.

PROCESS FOR OBTAINING PURE METALLIC COPPER FROM A SOLUTION OF A SALT OF COPPER.

No. 924,077.     Specification of Letters Patent.     Patented June 8, 1909.

Application filed April 21, 1908. Serial No. 428,414.

*To all whom it may concern:*

Be it known that I, LUCIEN JUMAU, citizen of France, residing at Paris, in the said Republic, have invented new and useful Improvements in Processes for Obtaining Pure Metallic Copper from a Solution of a Salt of Copper, (for which I have obtained a patent of addition in France, No. 6,825, bearing date October 27, 1906,) of which the following is a specification.

My invention relates to an improved process for obtaining pure metallic copper from a solution of a salt of copper, and it consists in the steps and processes herein described and claimed.

In the usual wet method of extracting copper, from its ores, the latter, with or without previous roasting, are leached with a suitable solution for dissolving the copper, the latter being usually extracted in the form of a sulfate.

According to my improved process, the solution containing salts of copper is heated, under pressure, to a high temperature in the presence of a reducing gaseous agent, constituted by hydrogen, or by a gaseous mixture having as a base the very powerful reducing agent above specified. Therefore, according to my improved process, the reducing agent which I desire to claim is hydrogen. As, however, the said gas (hydrogen) is, actually, produced by means of processes which yield an industrial product having a high price, I apply industrially my process by substituting, for pure hydrogen, gaseous mixtures having said hydrogen as base. Such category of gases includes hydrocarbons, water gas, illuminating gas, poor gas and the like.

In all cases, the neutral or acid solution of copper sulfate, is added with the gaseous mixture selected, heated in a closed vessel and under pressure; said solution thus treated yields metallic copper, sulfuric acid, and a product of decomposition of the mixture selected, said product varying obviously, according to the kind of the said mixture. In the case of pure hydrogen, the product of decomposition will be avoided, whereby the typical equation of my improved process will be the following:

$$SO_4Cu + H_2 = Cu + SO_4H_2.$$

It is to be remarked that, in the case of treating ores containing sulfur, but a quantity of the same insufficient to produce, by previous roasting of the ore a quantity of sulfurous acid, sufficient to insure the complete reduction, in the form of metallic pure copper, of the copper contained in the solution, it is possible to employ said sulfurous acid simultaneously with hydrogen, or industrial gaseous mixtures containing the same, in order to insure the aforesaid reduction.

I have described my preferred process, but obviously, changes could be made within the spirit and scope of my invention.

Having thus described my invention, what I claim as new and desire to secure by Letters-Patent is:

1. The herein described process for obtaining copper from a solution containing salts of copper, which consists in subjecting said solution to heat and pressure, in the presence of gaseous reducing agent containing hydrogen.

2. The herein described process for obtaining copper from a solution containing salts of copper, which consists in subjecting said solution to heat and pressure, in the presence of a reducing agent containing hydrocarbon.

3. The herein described process for obtaining copper from a solution containing salts of copper, which consists in subjecting said solution to heat and pressure, in the presence of gaseous reducing agent containing a mixture of hydrocarbons.

4. The herein described process for obtaining copper from a solution containing salts of copper, which consists in subjecting said solution to heat and pressure, in the presence of gaseous reducing agent composed of illuminating gas.

In testimony whereof, I have signed my name to this specification in the presence of two subscribing witnesses.

LUCIEN JUMAU.

Witnesses:
   JULES FAYOLLET,
   EUGENE PICHON.